United States Patent [19]

Hoffmann

[11] Patent Number: 4,791,862

[45] Date of Patent: Dec. 20, 1988

[54] ELECTRIC TOASTER

[75] Inventor: Erich Hoffmann, Bergisch Gladbach, Fed. Rep. of Germany

[73] Assignee: Robert Krups Stiftung & Co. KG, Solingen, Fed. Rep. of Germany

[21] Appl. No.: 50,761

[22] Filed: May 15, 1987

[30] Foreign Application Priority Data

Nov. 23, 1985 [DE] Fed. Rep. of Germany ....... 3541425

[51] Int. Cl.$^4$ .............................................. A47J 37/08
[52] U.S. Cl. ...................................... 99/385; 99/401; 99/451
[58] Field of Search ................. 99/329 RT, 385, 386, 99/390, 401, 451

[56] References Cited

U.S. PATENT DOCUMENTS

| | | | |
|---|---|---|---|
| 2,552,135 | 5/1951 | Bertino | 99/329 RT X |
| 3,641,921 | 2/1972 | Toyooka et al. | 99/390 |
| 4,346,651 | 8/1982 | Schickedanz | 99/390 X |
| 4,491,066 | 1/1985 | Juriga et al. | 99/401 X |
| 4,534,282 | 8/1985 | Marinoza | 99/451 |
| 4,577,550 | 3/1986 | Maroti et al. | 99/329 RT |

Primary Examiner—Donald Watkins
Attorney, Agent, or Firm—Peter K. Kontler

[57] ABSTRACT

An electric toaster wherein the housing defines a toasting chamber for slices of bread or other goods and the chamber has an outlet for toasted goods at or close to its lowermost portion. The chamber is flanked by two ceramic panels which can store substantial amounts of heat and transmit infrared radiation. Each panel defines with a semicylindrical reflector a compartment for one or more halogen lamps which emit radiation directly against the respective panel or indirectly as a result of deflection by the corresponding reflector. Gravitational descent of goods from the chamber can be blocked by a gate- or rod-like barrier which is movable into the outlet by hand or automatically in response to completion of a toasting operation.

17 Claims, 3 Drawing Sheets

ELECTRIC TOASTER

BACKGROUND OF THE INVENTION

The invention relates to toasters in general, and more particularly to improvements in electric toasters, especially automatic or semiautomatic toasters which can automatically start and/or terminate the toasting of slices of bread, muffins, rolls and/or other edible commodities whose appearance and/or taste is enhanced as a result of heating and/or browning.

Presently known toasters include a first group wherein the toasting chamber has an inlet for admission of commodities to be treated and such inlet also serves as an outlet for treated goods. These toasters are often provided with means for automatically expelling toasted commodities, and more particularly for expelling portions of toasted goods so that the thus exposed portions can be grasped by hand. The toasters of a second group have toasting chambers with an inlet for admission of goods to be toasted and with a discrete outlet for evacuation of freshly toasted goods. If the goods tend to leave the chamber under the action of gravity, the toasters of the second group are provided with blocking devices which prevent the goods from leaving the toasting chamber prior to completion of the toasting operation. The inlet is normally located at the top of the housing and the outlet is located at a level sufficiently below the inlet to ensure that the goods in the chamber will tend to leave the chamber under the action of gravity, i.e., that the freshly toasted goods will automatically leave the housing as soon as permitted by the blocking devices. An advantage of toasters which belong to the just discussed second group is that an entire slice of toast bread or the like can leave the housing of the toaster as soon as the toasting operation is completed, i.e., that the freshly toasted goods do not undergo undesirable additional heating, browning and/or drying. Moreover, crumbs and otherwise configurated particles of toasted commodities tend to leave the toasting chamber by gravity to thus reduce the likelihood of rapid contamination of the interior of the housing.

The sides of the toasting chamber in each of the aforediscussed types of toasters transmit heat. As a rule, the toasting chamber is flanked by grids which can be provided with projections extending into the chamber to reduce the area of contact between the grids and the goods to be toasted. Such grids exhibit serious drawbacks, mainly because they must be provided with large interstices or otherwise configurated openings which permit penetration of heat from the heating elements into the chamber but which also permit bread crumbs and other particulate matter to reach the heating elements behind the grids. The compartments for the heating elements are rapidly contaminated by foreign matter which accumulates at the bottom of each compartment and which is likely to be ignited as soon as the top of the pile of contaminants comes sufficiently close to the heating elements and/or when the temperature in the compartment reaches a certain point. Moreover, the grates are normally permanently installed in the housing so that they cannot be readily cleaned. Still further, the grate bars which actually contact the goods in the toasting chamber leave impressions in the form of darker (charred) strips which affect the appearance of the goods.

The heating elements of presently known toasters are electric resistance heaters, i.e., pieces of normally convoluted metallic wire which emits heat in response to connection in circuit with a source of electrical energy. The cost of making convoluted wire is rather high, and such wires must be mounted on insulators which are then installed in the housing of the toaster. Another drawback of resistance heaters is that a certain interval of time must elapse before they begin to emit heat at a desired maximum rate. Furthermore cooling of such resistance heaters takes up a relatively long interval of time so that heat energy is wasted immediately after the start and also upon completion of a toasting operation, and electric energy is wasted at the start of each such operation. Heat which is radiated by resistance heaters subsequent to their disconnection from the energy source can bring about undesirable additional or extensive toasting of certain commodities, especially if the toasted commodities are not automatically expelled or otherwise evacuated from the toasting chamber.

OBJECTS AND SUMMARY OF THE INVENTION

An object of the invention is to provide an electric toaster wherein the means for heating the goods in the toasting chamber can emit heat at the desired rate in immediate response to completion of the circuit of heating elements and wherein the likelihood of excessive toasting upon disconnection of heating elements from the energy source is much less pronounced that in conventional toasters which employ electric resistance heaters.

Another object of the invention is to provide an electric toaster whose toasting action is more uniform and more predictable than that of conventional toasters.

A further object of the invention is to provide a relatively simple, compact and inexpensive toaster wherein the heating elements are not likely to be contaminated by crumbs and/or other foreign matter.

Still another object of the invention is to provide the above outlined toaster with novel and improved means for preventing crumbs and the like from reaching the heating elements without interfering with the transmission of heat from the heating elements to the toasting chamber.

An additional object of the invention is to provide an electric toaster wherein the heating elements are constructed and mounted in a novel and improved way and wherein the toasting chamber can have a combined inlet-outlet or discrete inlets and outlets.

A further object of the invention is to provide a novel and improved method of toasting slices of bread or the like.

Another object of the invention is to provide a toaster which can employ commercially available components and wherein such commercially available components are assembled and cooperate in a novel and improved way.

The improved toaster can be used to heat and brown slices of bread and/or other goods and comprises a housing which defines a chamber for goods to be toasted. The toaster further comprises means for heating the goods in the chamber; such heating means includes at least one halogen lamp in the housing and reflector means for directing radiation which issues from the lamp against the goods in the chamber. More specifically, the reflector means is or can be designed to deflect that percentage of radiation which does not propagate itself toward the chamber without any deflection.

The lamp emits infrared radiation, and the toaster preferably further comprises a panel which is or can be made of vitreous enamel or an analogous ceramic material capable of storing substantial amounts of heat and transmitting infrared radiation. The panel is disposed between the lamp and the reflector means on the one hand and the chamber on the other hand so that radiation which issues from the lamp penetrates into the chamber by way of the panel. The reflector means and the panel preferably define a compartment which confines the lamp and is at least substantially sealed from the chamber so that crumbs and other particulate material and/or fumes and steam cannot penetrate into the compartment.

In accordance with a presently preferred embodiment, the housing contains a pair of spaced apart parallel or substantially parallel panels which flank the chamber and transmit infrared radiation. The heating means of this toaster comprises at least one halogen lamp (e.g., a quartz lamp) for each panel, and the reflector means comprises a reflector for each panel. The reflectors and the respective panels define compartments for the corresponding lamps. Such toaster ensures that a slice of bread and/or other goods in the chamber can be toasted from two sides. Each reflector is arranged to direct radiation issuing from the respective lamp or lamps through the corresponding panel so that the radiation ifluences the temperature and the color of the goods in the chamber.

The reflector means is preferably provided with a concave side which faces the lamp or lamps and has a focal point which is occupied by the lamp. The center of curvature of such reflector means is preferably located in or close to the panel.

The chamber has an outlet which is preferably located at such a level that toasted goods can be evacuated from the chamber under the action of gravity, and the toaster than further comprises a barrier which is movable with reference to the housing to and from an operative position in which it interferes with the evacuation of goods from the chamber under the action of gravity. The barrier can include at least one gate which is movable (e.g., pivotable) across and away from the outlet. Means can be provided for pivoting the gate, either by hand or automatically in response to completed toasting of goods in the chamber. The barrier can also comprise an elongated rod-like or analogous member which is reciprocable to and from the operative position, either by hand or automatically by a means which monitors the condition of goods in the chamber. For example, on elongated rod-like barrier can include a portion which extends from the housing so that it can be grasped by a hand which moves it to and from the operative position.

The housing includes at least one socket for each lamp, and such lamp and its socket or sockets can be at least partially confined in the aforementioned compartment i.e., the reflector means preferably surrounds a portion of or the entire lamp and its socket or sockets.

The housing can include means (such as the aforementioned socket or sockets) for movably mounting the lamp so that the lamp is movable between a plurality of positions with reference to the reflector means, particularly at different distances from the panel and toasting chamber. The socket or sockets are preferably movable with the lamp, and the housing can be provided with suitable detent means for releasably holding the socket or sockets in a selected position. Such adjustment of the position of the lamp can be effected manually or automatically, e.g., depending on the desired intensity of toasting of bread slices or other edible goods.

The novel features which are considered as characteristic of the invention are set forth in particular in the appended claims. The improved toaster itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
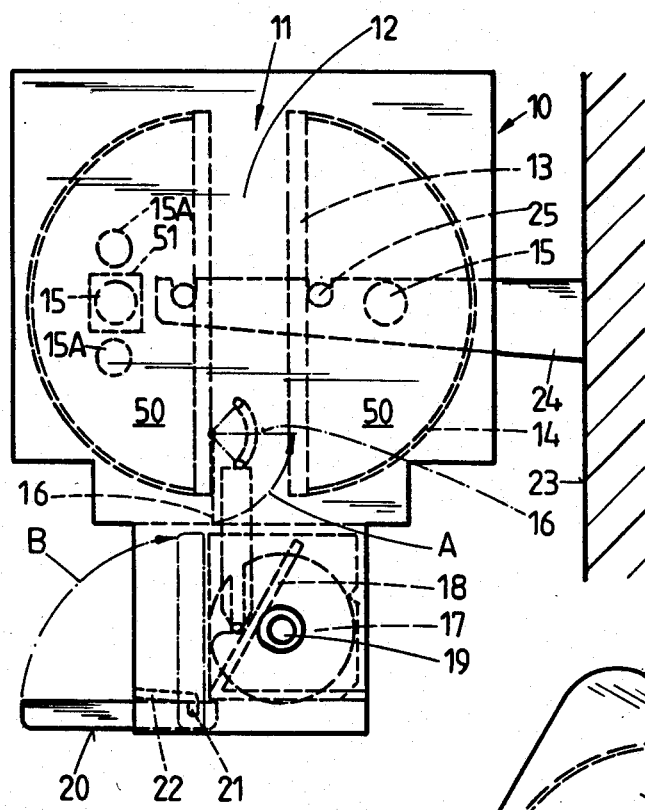
FIG. 1 is a schematic elevational view of a toaster which embodies one form of the invention and whose housing is suspended on two brackets, the toasting chamber being located in a vertical plane.

Referring first to FIG. 1, there is shown a toaster without any electrical conductors and other standard parts whose construction, mounting and/or mode of operation form no part of the invention. The toaster comprises a substantially box-shaped housing 10 which is or can be assembled of several parts. Thus, the housing 10 can comprise a one-piece rear wall (the right-hand wall, as seen in FIG. 1), a front wall (the left-hand wall as seen in FIG. 1) and two sidewalls (facing toward and away from the observer of FIG. 1). An extension of the rear wall is bent to the left so as to form a portion of or the entire top wall of the housing 10. If the rear wall forms only a portion of the top wall, the remaining portion of the top wall is formed by an extension of the front wall; such extension is bent to the right as seen in FIG. 1. The top wall defines a slot-shaped inlet 11 which can be flanked by the aforementioned extensions of the front and rear walls of the housing, and such inlet forms the topmost part of a vertical toasting chamber 12. The width of the inlet 11 and of the major part of toasting chamber 12 suffices to receive (with freedom of downward movement under the action of gravity) slices 34 (see FIG. 3) of toast bread or other edible goods which are to be heated and toasted. The bottom wall of the housing 10 is or can be formed by a further bent-over extension of the rear wall, by a further bent-over extension of the front wall and/or by the bent-over extension of the one and/or the other sidewall of the housing.

In accordance with a feature of the invention, the chamber 12 is flanked by two parallel vertical panels 13 which are made of a ceramic material, particularly a vitreous enamel known as Cerin (trademark). Such material readily transmits infrared radiation and can store substantial amounts of heat. At least those sides of the panels 13 which are immediately adjacent the toasting chamber 12 are smooth to offer little resistance to sliding movement of the goods to be toasted. The panels 13 need not have any openings.

The means for heating the goods in the chamber 12 includes the panels 13 and two halogen lamps 15 together with two substantially semicylindrical reflectors 14. Each reflector 14 defines with the respective panel 13 a compartment 50 which confines at least the major part of the respective lamp 15 and is preferably sealed or practically sealed from the chamber 12 so that crumbs of bread and other solid particles cannot penetrate into the compartments 50 for the lamps. The center of curvature of the concave side of each of the two reflectors 14 is located in or close to the respective panel 13, and the lamps 15 are preferably mounted at or close to the foci of such concave sides. The reflectors 14 can be made of aluminum or an aluminum alloy.

The number of halogen lamps 15 (each of which can constitute a quartz lamp capable of emitting infrared radiation) in each of the compartments 50 can be increased to two or more. FIG. 1 shows (by phantom lines) two additional lamps 15A in one of the two compartments. The number of lamps will be selected in dependency on their output, the dimensions of the chamber 12 and/or other parameters which influence the toasting action.

Each lamp is or can constitute a commercially available article, the same as its sockets 51 which are mounted on the respective sidewalls of the housing 10. It is preferred to employ halogen lamps whose output in the infrared range of the spectrum is high. If the panels 13 are made of Ceran or a similar ceramic material, they offer negligible resistance to the penetration of infrared radiation. A substantial percentage of radiation which issues from the lamps 15 passes directly through the respective panels 13 to influence the condition of goods in the chamber 12; the remaining percentage of such radiation is deflected by the respective reflectors 14 and also penetrates into the chamber 12 by way of the corresponding panels 13. Infrared radiation heats the panels 13 so that they store and radiate heat which also influences the goods in the chamber 12, especially those portions of goods which are close or immediately adjacent the respective panels.

The outlet at the lower end of the chamber 12 is normally blocked by a barrier in the form of a pivotable gate 16 which thus prevents the goods from leaving the chamber 12 by gravity while the toasting operation is in progress. The illustrated barrier or gate 16 is a horizontal flap which is pivotable between an operative position in a horizontal plane (in which the gate extends across and blocks the outlet of the chamber 12) and a vertical position in which the outlet is free and the freshly toasted goods can leave the chamber 12 under the action of gravity. The direction in which the gate 16 is pivotable from its operative to its inoperative position (both positions are shown in FIG. 1) is indicated by an arrow A.

The means for moving the gate 16 between the two positions includes an actuator 17 which is installed in or on the housing 10 at a level below the outlet of the chamber 12 and includes a readily accessible rotary handgrip member 19. The actuator 17 is or can be of the type disclosed in German Utility Model No. 1,875,692. The handgrip member 19 is or resembles a knob which can be rotated by two fingers to turn a disc-shaped carrier for an eccentrically mounted link which is articulately connected to and can pivot the gate 16 between the operative and inoperative positions. The articulate connection between the link and the gate 16 travels along an arcuate path which is denoted by the arrow A.

The goods which are permitted to leave the chamber 12 under the action of gravity descend along a suitably inclined ramp or chute 18 to enter an intercepting and collecting receptable 20 which is permanently or detachably connected to the housing 10. The upper edge of the ramp 18 is located at a level directly or closely below the lower edge of the right-hand ceramic panel 13. The receptable 20 is preferably detachable from the housing 10 so that the bottom wall of the housing 10 can be placed onto a table, counter top or another suitable support and that the supply of freshly toasted and still hot edible goods need not be touched by hand. It is also possible to pivotably or otherwise movably mount the receptable 20 on the housing 10 in such a way that the receptable can be pivoted or shifted into the housing 10 (either entirely or in part) when the toaster is not in use. The receptable 20 is provided with two slots 22 (only one can be seen in FIG. 1) which include horizontal and vertical portions and receive portions of pivot pins 21 provided on the housing 10 and serving to permit the receptable to pivot to and from the illustrated position. The slots 22 have open ends to allow for complete separation of the receptacle 20 from the housing 10. The pivot pins 21 can be said to constitute the pintles of simple hinges which pivotably as well as separably couple the receptable 20 to the housing 10.

The housing 10 is suspended on a vertical wall 23, and more specifically on two horizontal brackets 24 (only one can be seen in FIG. 1) which extend through slots provided in the rear wall of the housing. The sidewalls of the housing 10 have inwardly extending pins 25 which can enter complementary recesses in the upper edge faces of the brackets 24 to properly locate the housing at a predetermined distance from the wall 23. Those portions of the brackets 24 which extend into the housing 10 are or can be parallel with and closely or immediately adjacent the inner sides of the respective sidewalls. If the brackets 24 are not available or not desired, the housing 10 can be made to rest on a table, a counter top or on any other suitable support.

Figure 2:
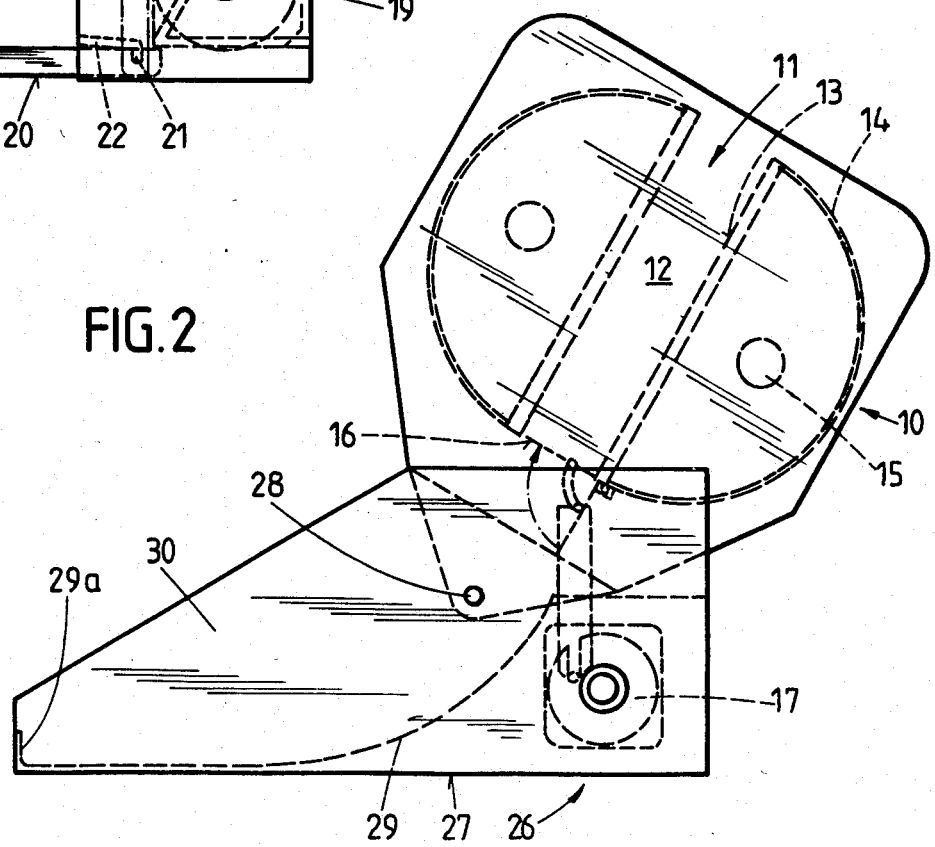
FIG. 2 is a schematic elevational view of a modified toaster wherein the housing is pivotable between the illustrated operative position and a collapsed position.

FIG. 2 shows a second toaster wherein all such parts which are identical with or clearly analogous to the corresponding parts of the toaster of FIG. 1 are denoted by similar reference characters. The construction of the heating means in the housing 10 is the same as described in connection with FIG. 1. The toasting chamber 12 is not exactly vertical but its outlet is located at a level well below the inlet 11 so that the goods which are introduced into the housing 10 tend to leave the chamber under the action of gravity. The barrier of the goods at the outlet of the toasting chamber again comprises a gate 16 which is pivotable by an actuator 17. The receptacle 20 of FIG. 1 is replaced with a support or base 26 which can be placed on a table or the like and has two upright sidewalls or cheeks 30 for registering pivot pins 28 which carry the housing 10 and enable the housing to pivot between the illustrated operative position and a second or collapsed position in which a substantial part of the housing is located in the space between the cheeks 30 immediately above the bottom wall 27 of the support 26. A suitably inclined chute 29 between the cheeks 30 of the support 26 has a stop 29a serving to arrest toasted goods which leave the chamber 12 of the housing 10 in response to pivoting of the gate 16 to its inoperative position (the gate is then located in the plane of and directly below the right-hand ceramic panel 13).

Figure 3:
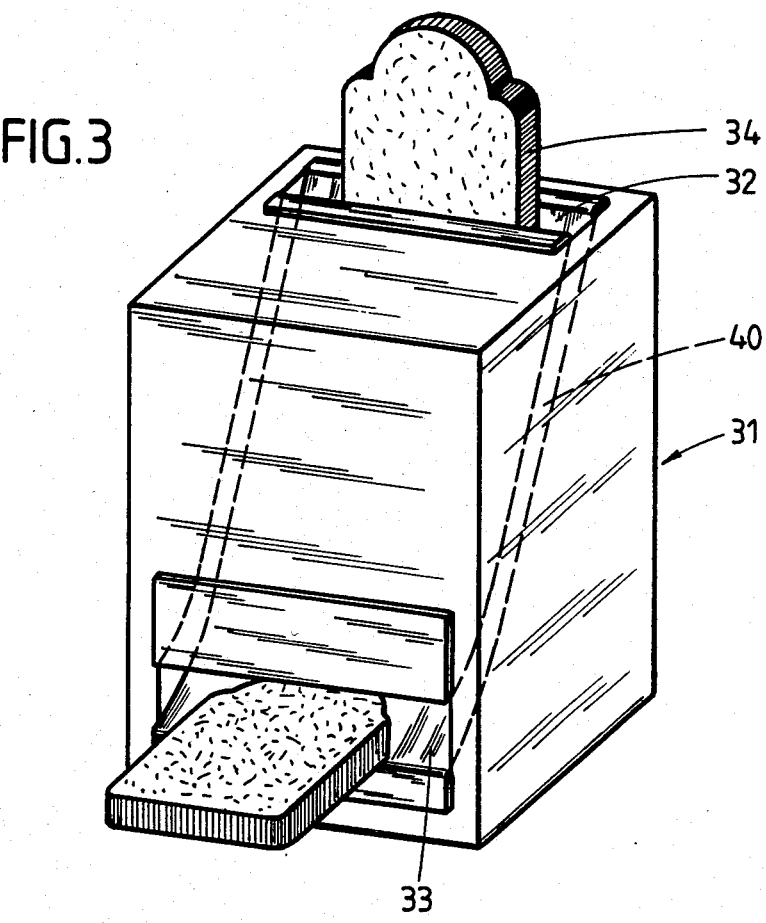
FIG. 3 is a perspective view of a third toaster.
Figure 5:
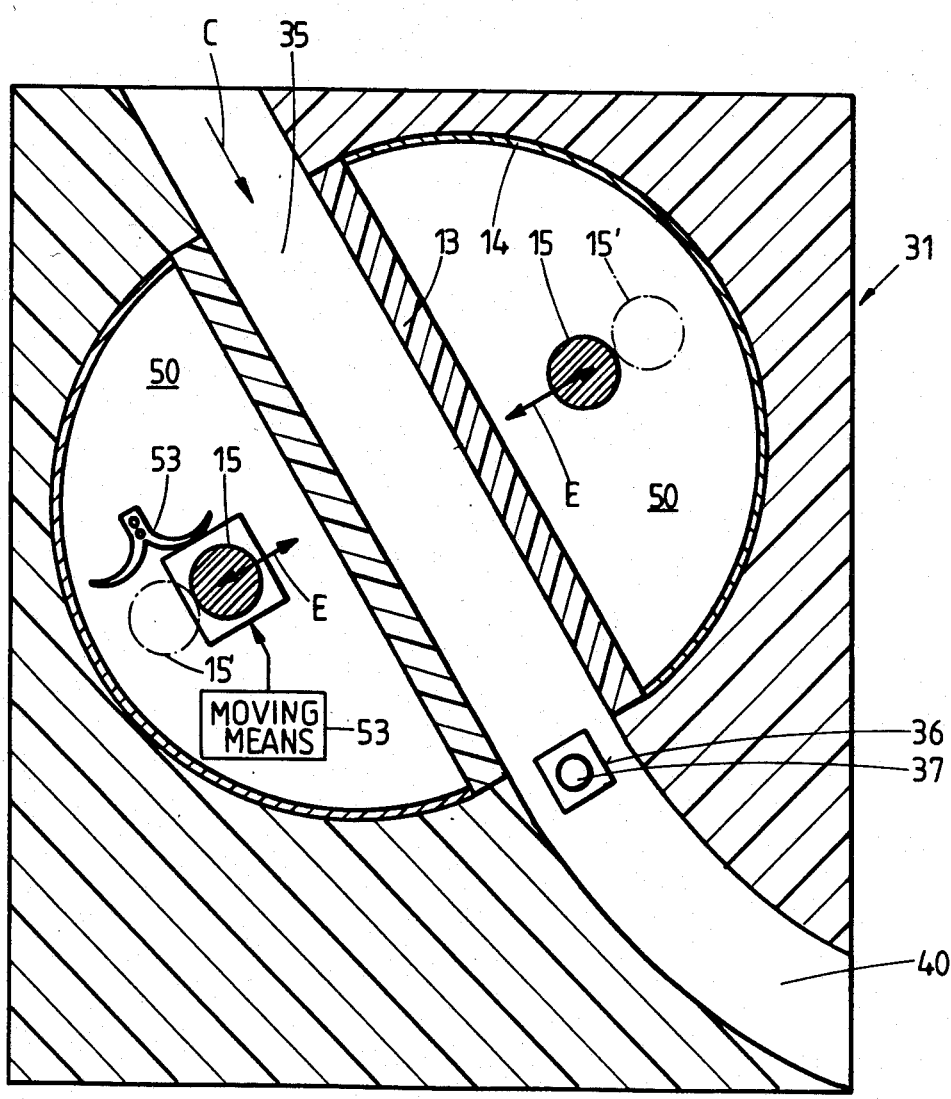
FIG. 5 is an enlarged vertical sectional view of the toaster which is shown in FIG. 3 and wherein the housing contains a modified barrier for the outlet of the toasting chamber.

FIGS. 3 and 5 show a third toaster having a box-shaped housing 31 which defines a downwardly sloping toasting chamber 40 with an inlet 32 in the top wall and an outlet 34 in the front wall of the housing. A slice 34 of toast bread is shown in the process of entering the main portion 35 of the chamber 40. The bottom wall of the housing 31 rests on a suitable support, e.g., on a table or counter top, and the area of this bottom wall can be smaller than the area of one of the two sidewalls, the rear wall or the front wall of the housing. The inlet 32 of the chamber 40 is close to the rear wall of the housing 31, and the outlet 33 is provided in the lower or lowermost portion of the front wall so that the slope of the main portion 35 of the chamber 40 suffices to ensure that each slice 34 which has entered the chamber 40 will tend to slide toward, through and beyond the outlet 33. The width of the main portion 35 of the chamber 40 suffices to allow for insertion of relatively thick slices of bread or any other edible commodity which requires heating and/or browning. The direction in which the commodity that is to undergo treatment in the main portion 35 of the chamber 40 tends to slide is indicated by an arrow C.

The barrier 37 in or close to the outlet 33 of the chamber 40 is a reciprocable rod-like member which is movable toward and away from the observer of FIG. 5. To this end, a portion 36 of the member 37 extends from the housing 31 and can be grasped by hand to enable a freshly toasted slice of bread or the like to leave the chamber 40 when the toasting operation is completed. The person in charge can decide to extract the member 37 from the outlet 33 upon visual observation of the commodity in the chamber 40. Alternatively, the part which is denoted in FIG. 5 by the character 36 can constitute or include a means for automatically extracting the member 37 from the outlet 33 when the toasting operation is completed. The manner of monitoring the condition of goods in a toasting chamber end of generating signals which are used to terminate the toasting operation is well known in the art of toasters and need not be described here. The operation of the means for automatically moving the member 37 to its inoperative position can resemble or can be analogous to that of the means which causes a conventional toaster to pop, i.e., to partially expel the freshly toasted commodity from the chamber and to simultaneously turn off the means for heating the chamber.

The construction of the means for heating the chamber 40 is shown in FIG. 5. Such heating means comprises two parallel panels 13 of ceramic material which can store heat and transmit ultraviolet radiation, two reflectors 14 which define with the respective panels 13 substantially semicylindrical compartments 50, and halogen lamps 15 which are installed in the respective compartments 50, preferably in the same way (at the foci of the respective reflectors) as described in connection with FIG. 1. The same holds true for the positions of centers of curvature of the reflectors 14 with reference to the planes of the respective panels 13. The compartments 50 are sealed from the chamber 40 so that they cannot accumulate crumbs and other foreign matter.

The end portions of each lamp 15 are mounted in the respective sidewalls of the housing 31, preferably in such a way that they can be shifted, with the respective lamps 15, in directions which are indicated by double-headed arrows E, i.e., nearer to and further away from the respective panels 13. This results in a change of the intensity of toasting action upon the goods in the main portion 35 of the chamber 40. The means 52 for moving the sockets 51 in directions which are indicated by arrows E can be operated manually or automatically, e.g., in dependency on the temperature in the chamber 40, and the sidewalls of the housing 31 can be provided with suitable detent devices (e.g., leaf springs 53 receivable in the notches of the respective sockets 51) for releasably holding the sockets 51 and the respective lamps 15 in selected positions, i.e., at selected distances from the respective panels 13. A second position of each of the lamps 15 shown in FIG. 15 is indicated by a phantom-line circle, as at 15'.

The means for automatically moving the gate 16 or the rod-like member 37 and/or the sockets 51 between different positions can include a timer which is started when the circuit of the lamps 15 is completed and transmits a signal to move the barrier 16 or 37 to inoperative position or to retract the lamps 15 of FIG. 5 after elapse of a preselected interval of time which is considered necessary to complete a satisfactory toasting operation. The timer can also serve as a means for disconnecting the lamps 15 from the source of electrical energy (e.g., from a wall outlet which is connectable with the housing 10 or 31 by a conventional electric cable).

Figure 4:
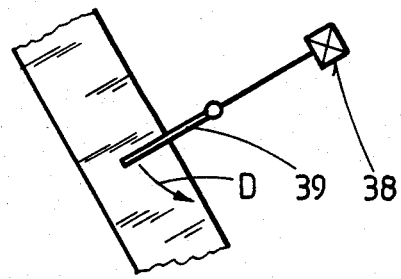
FIG. 4 shows a detail in the housing of the toaster which is shown in FIG. 3.

FIG. 4 shows a modified barrier 39 (which resembles the gate 16 of FIGS. 1 and 2) adapted to be used in the housing 31 of FIGS. 3 and 5 as a substitute for the reciprocable barrier 37. The barrier 39 of FIG. 4 is pivotable in and counter to the direction which is indicated by an arrow D in response to actuation of a control device 38 which can include the aforementioned timer and/or other means for automatically pivoting the barrier 39 in the direction of arrow D when the toasting operation is completed or when the preselected interval of time has elapsed. The control means 36 or 38 can include an electromagnet which is energized in response to signals from a thermometer or from another suitable measuring instrument to extract the barrier 37 or to pivot the barrier 39 when the toasting operation is completed.

The improved toaster is susceptible of many additional modifications. Thus, the number of halogen lamps can be increased above one at each side of the toasting chamber and each compartment 50 can receive one or more straight, U-shaped or otherwise configurated lamps. Furthermore, and if a compartment 50 received two or more lamps, the corresponding reflector 14 can be modified so that it includes a concave surface behind each lamp. The controls of a toaster wherein the compartments 50 contain pairs or larger numbers of lamps are preferably designed with a view to enable the operator to turn on a single lamp or to turn on a group of two or more lamps, depending on the desired duration and/or intensity of toasting action.

Each of the illustrated toasters (for example, the toaster of FIGS. 3 and 5) can be designed in such a way that the lamps 15 are connected in circuit with a source of electrical energy in automatic response to introduction of a slice 34 or another edible commodity into the toasting chamber. Thus, a slice 34 which has descended into the main portion 35 of the chamber 40 in the direction of arrow C in FIG. 5 can strike against the barrier 37 whereby the barrier 37 actuates a weight- or impact-responsive switch of the control means 36 to complete the circuit of the lamps 15 in the compartments 50. The barrier 37 can be said to constitute the trip of such impact- or weight-responsive switch. The switch can start a timer which opens the circuit of the lamps 15 after elapse of a preselected interval of time and initiates the movement of the barrier 37 to its retracted position so that the commodity can leave the chamber 40 by way of the outlet 33. As mentioned above, it is also possible to simplify the controls of the toaster in that the barrier 37 or any other suitable barrier is simply reciprocable or otherwise movable by hand when the user detects that the condition of goods in the chamber 12 or 40 is satisfactory for evacuation of such goods from the toaster. It is also possible to provide the toaster with semiautomatic controls which automatically complete the circuit of the lamps in response to insertion of goods into the toasting chamber but do not automatically terminate the toasting operation. Alternatively, the semiautomatic controls can be designed in such a way that they cannot complete the circuit of the lamps 15 but can automatically terminate the toasting operation, either after elapse of a selected interval of time or as a result of automatic detection that the temperature in the toasting chamber has reached a preselected value and/or that the color of commodities in the toasting chamber is satisfactory for automatic termination of the heating and toasting operation.

An advantage of the improved toaster is that the toasting chamber is flanked by panels (13) which need not be provided with interstices and/or other types of openings for transmission of heat and which, therefore, prevent penetration of solid particulate matter from the toasting chamber into the respective compartments. This reduces the likelihood of accumulation and eventual combustion of foreign matter in the compartments for the heating elements. Moreover, the smooth surfaces of the panels 13 are highly unlikely to cause excessive localized browning or charring of goods in the toasting chamber. Still further, the panels 13 can be more readily cleaned than grids of metallic wire or the like which are used in conventional toasters wherein the heating elements are electric resistance heaters and the walls flanking the toasting chamber must be provided with interstices to facilitate penetration of heat into the toasting chamber. All that is necessary is to clean those sides of the panels 13 which face the toasting chamber because the compartments 50 are not accessible to contaminants.

Another advantage of the improved toaster is that the electric heating elements are halogen lamps. A halogen lamp (e.g., a quartz lamp which emits substantial amounts of infrared radiation) can emit heat at a miximum rate in immediate response to completion of its circuit so that the toasting operation can begin as soon as the user or the aforementioned automatic weight- or impact-responsive switch completes the circuit of lamps in the respective compartments 50. This is desirable and advantageous on several grounds, i.e., the toasting operation is completed more rapidly because no time is wasted to heat up the lamps and the energy requirements of the heating means are lower because connection of the lamps to the energy source is immediately followed by transmission of heat at a desired optimum rate. Rapid cooling of the lamps 15 and/or of the panels 13 when the lamps are disconnected from the energy source ensures that the goods in the chamber are not subjected to undersirable secondary treatment which can result in excessive drying, charring or darkening of the commodities. Still further, the lamps 15 cooperate with the respective reflectors 14 and with the corresponding panels 13 to ensure uniform toasting of goods in the toasting chamber; such toasting is much more satisfactory than in conventional toasters which employ electric resistance heaters. The efficiency of the heating means including infrared lamps is very high because the reflectors 14 ensure that all infrared rays which do not impinge directly upon the adjacent panels 13 are deflected against these panels by the concave sides of the reflectors so that the panels not only transmit large amounts of infrared radiation but are also heated to radiate heat into the adjacent portions of the chamber 12 or 40. Panels 13 which are made of aforementioned ceramic materials are capable of storing substantial amounts of heat so that they can contribute significantly to rapid completion of the toasting operation.

Experiments with the improved toaster indicate that the housing 10 or 31 is heated very little or not at all. This is attributable to the presence of reflectors 14 and, at least to a certain extent, to the aforediscussed configuration and mounting of the reflectors. Consequently, the housing of the improved toaster can be made of materials (particularly plastics) which need not be capable of standing elevated temperatures but exhibit other advantages which are desirable for the housing of a toaster. Moreover, this renders it possible to select relatively inexpensive materials to thus reduce the overall cost of the toaster.

An advantage of the feature that the lamps 15 are placed at the foci of the respective reflectors and that the centers of curvature of the reflectors are located in or close to the respective panels 13 is that a large percentage of infrared radiation which is emitted by the lamps 15 impinges directly upon the respective panels 13 and that the remaining radiation is deflected by the concave sides of the reflectors to leave the compartments 50 substantially at right angles to the planes of the respective panels 13. Commercially available halogen lamps can be used without any modifications, the same as commercially available sockets for such lamps. It is preferred to use halogen lamps which emit large amounts of infrared radiation. The dimensions of the housing 10 or 31 can be selected in dependency upon the dimensions of available halogen lamps; alternatively, the manufacturer can decide to select larger numbers of relatively small lamps for installation in each of the compartments 50.

An advantage of the aforediscussed barriers (such as the gates 16, 39 and the rod-like member 37) is that they prevent premature evacuation of goods from the respective toasting chambers as well as that they can be readily positioned with a view to maintain the goods in the chamber 12 or 40 in optimum positions with reference to the respective panels 13. The barriers 16, 39 need not necessarily pivot to and from their operative positions, and such pivoting need not take place through exactly 90 degrees. For example, the barrier 16 or 39 can be shifted (either longitudinally or sideways) to and from its operative position. The barriers 16, 37 and 39 need not completely close the outlets of the respective chambers; all that counts is to ensure that the outlets are closed or blocked sufficiently to prevent premature expulsion of toasted commodities. It is further clear that the improved heating means including the panels 13, reflectors 14 and lamps 15 can be used with equal or similar advantage in toasters wherein the inlet at the top of the toasting chamber also serves as a means for permitting evacuation of toasted goods. This obviates the need for barriers but eliminates the possibility of complete evacuation of goods from the chamber under the action of gravity when the toasting operation is completed.

Manually operated means for moving the barrier to and from its operative position will be used in popularly priced toasters. More sophisticated toasters will be equipped with the aforediscussed automatic or semiautomatic means for moving the barriers to and from operative positions. The aforediscussed timer or clock of automatic or semiautomatic control means for the barrier can be adjusted by hand or otherwise in order to ensure that the interval of treatment suffices to guarantee adequate toasting of selected commodities, e.g., slices of bread, halves or rolls, portions of muffins and others.

The dimensions of the housing and toasting chamber can be selected in such a way that the chamber can receive a single piece of bread or the like at a time or that the chamber can receive two or more slices or the like, either side-by-side or one above the other. Such toasters will employ relatively large panels or composite panels and their compartments can confine pairs or larger numbers of halogen lamps, each in front of a discrete reflector or two or more in front of a common reflector. It is further clear that the housing of a relatively large toaster can have several toasting chambers and a correspondingly increased number of panels 13, reflectors 14 and lamps 15. The dimensions of each toasting chamber can be selected in such a way that the chamber can accept relatively large commodities, for example, slices of large loaves of bread or the like.

Halogen lamps which can be used in the toaster of the present invention are manufactured and distributed by Radium Lampenwerke Wipperfürth, Wipperfürth, German Federal Republic, under Catalog No. 12 1 223 21414.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A toaster for slices of bread and other goods, comprising a housing defining a chamber for goods to be toasted; means for heating the goods in said chamber, including at least one infrared radiation emitting halogen lamp in said housing and reflector means for directing radiation which issues from said lamp against the goods in said chamber; and heat storing means including at least one panel which transmits infrared radiation and is interposed between said lamp and said chamber, said panel and said reflector means defining a compartment which confines said lamp and is at least substantially sealed from said chamber.

2. The toaster of claim 1, wherein said heat storing means comprises a pair of heat storing panels which flank said chamber and transmit infrared radiation, said heating means comprising at least one halogen lamp for each of said panels and said panels being disposed between said chamber and the respective lamps, said reflector means comprising a reflector for each of said panels and each of said reflectors being arranged to direct radiation issuing from the corresponding lamp against the respective panel so that the thus directed radiation penetrates through the panel and into said chamber.

3. The toaster of claim 1, wherein said lamp is a quartz lamp which emits infrared radiation.

4. A toaster for slices of bread and other goods, comprising a housing defining a chamber for goods to be toasted; and means for heating the goods in said chamber, including at least one halogen lamp in said housing and reflector means for directing radiation which issues from said lamp against the goods in said chamber, said reflector means having a concave side facing said lamp and having a focal point, said lamp being located at said focal point.

5. The toaster of claim 4, further comprising a heat storing panel which transmits infrared radiation and is located between said lamp and said chamber, said concave side having a center of curvature in or close to said panel.

6. The toaster of claim 1, wherein said chamber has an outlet for evacuation of goods by gravity and further comprising a barrier movable with reference to said housing to and from a position in which the barrier interferes with evacuation of goods from the chamber under the action of gravity.

7. The toaster of claim 6, wherein said barrier includes a gate which is movable across and away from said outlet.

8. The toaster of claim 6, wherein said barrier is pivotable to and from said position and further comprising means for pivoting said barrier.

9. The toaster of claim 8, wherein said moving means includes means for mounting the toasting of goods in said chamber and for moving the barrier from said position in response to completion of the toasting operation.

10. The toaster of claim 6, wherein said barrier is reciprocable into and from said outlet.

11. The toaster of claim 10, wherein said barrier is elongated.

12. The toaster of claim 10, wherein said barrier includes a portion which is accessible to the hand of a person to allow for manual reciprocation of the barrier to and from said position.

13. The toaster of claim 10, further comprising means for automatically moving said barrier from said position upon completed toasting of goods in said chamber.

14. The toaster of claim 1, wherein said housing includes at least one socket for said lamp.

15. The toaster of claim 14, wherein said reflector means at least substantially surrounds said lamp.

16. A toaster for slices of bread and other goods, comprising a housing defining a chamber for goods to be toasted; and means for heating the goods in said chamber, including at least one halogen lamp in said housing and reflector means for directing radiation which issues from said lamp against the goods in said chamber, said housing including means for movably mounting said lamp so that the lamp is movable between a plurality of positions with reference to said reflector means.

17. The toaster of claim 16, wherein said mounting means includes at least one socket for said lamp, said socket being movable with said lamp between said plurality of positions and further comprising detent means for releasably holding the socket in a selected position.

* * * * *